United States Patent [19]

Roman

[11] 4,196,244
[45] Apr. 1, 1980

[54] WALL COVERING AND METHOD OF MAKING SAME

[75] Inventor: Charles A. Roman, Lake Hopatcong, N.J.

[73] Assignee: Dayco Corporation, Dayton, Ohio

[21] Appl. No.: 892,053

[22] Filed: Mar. 31, 1978

[51] Int. Cl.² .............................................. B32B 3/30
[52] U.S. Cl. .................... 428/159; 428/204; 428/207; 428/247; 428/315; 428/320; 428/337; 428/339; 428/340; 181/288
[58] Field of Search ............... 428/159, 166, 161, 172, 428/204, 207, 151, 904, 247, 310, 315, 320, 337, 339, 340; 156/209, 219, 220, 221, 78, 79, 278, 280; 264/132, 321, 45.6; 181/284, 288, 291, 290, 293, 294; 52/144, 309.8, 309.9; 427/262, 264, 267, 274, 277, 278, 373, 265, 270

[56] References Cited

U.S. PATENT DOCUMENTS

| 2,961,332 | 11/1960 | Nairn ...................................... 156/79 |
| 3,230,134 | 1/1966 | Studer ..................................... 156/79 |
| 3,278,322 | 10/1966 | Harkins, Jr. et al. ................. 427/373 |
| 3,562,043 | 2/1971 | Eddy ..................................... 428/159 |
| 3,962,507 | 6/1976 | McCreary et al. .................. 428/159 |

*Primary Examiner*—Stanley S. Silverman
*Attorney, Agent, or Firm*—Reuben Wolk

[57] ABSTRACT

A lightweight wall covering and method of making same are provided wherein such wall covering has a substantially smooth inside surface and a textured outer layer comprised of a substrate having an exposed surface defining the inside surface, a fluid impervious film bonded against the substrate, and an embossed expanded vinyl plastisol bonded against the film and defining the textured outer layer with the textured outer layer being defined by alternating recesses and dense projections substantially free of air spaces and with the textured outer layer having a substantially fluid imprevious skin.

7 Claims, 3 Drawing Figures

WALL COVERING AND METHOD OF MAKING SAME

BACKGROUND OF THE INVENTION

Wall coverings having outside surfaces made of a synthetic plastic material are gaining in popularity in residential homes, public buildings of all types, commercial buildings, and industrial buildings because of the capability of making such wall coverings with a deep texture having aesthetic appeal yet having great tear resistance, easy cleanability, and a long service life.

However, textured wall coverings proposed heretofore have been made employing substantial amounts of synthetic plastic materials thereby increasing the overall cost of these wall coverings and making them less cost competitive for many applications.

SUMMARY

It is a feature of this invention to provide a wall covering having a deep textured outer layer made of a synthetic plastic material yet being of minimum weight and hence minimum cost.

Another feature of this invention is to provide a wall covering of the character mentioned in which the deep textured outer layer is made of a decorative polyvinyl chloride.

Another feature of this invention is to provide a lightweight wall covering having a substantially smooth inside surface and a deep textured outer layer made of a polymeric material which may be a single color or a multicolored decorative pattern.

Another feature of this invention is to provide a lightweight wall covering having a deep textured other layer made of a synthetic plastic material and weighing less than 14 ounces per square yard.

Another feature of this invention is to provide a lightweight wall covering having a substantially smooth inside surface and a textured outer layer comprising a substrate having an exposed surface defining the inside surface, a fluid impervious film bonded against the substrate, and an embossed expanded vinyl plastisol bonded against the film and defining the textured outer layer with the textured outer layer being defined by alternating recesses and dense projections substantially free of air spaces with the textured outer layer having a substantially fluid impervious skin.

Another feature of this invention is to provide an improved method of making a lightweight wall covering of the character mentioned.

Therefore, it is an object of this invention to provide a lightweight wall covering and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
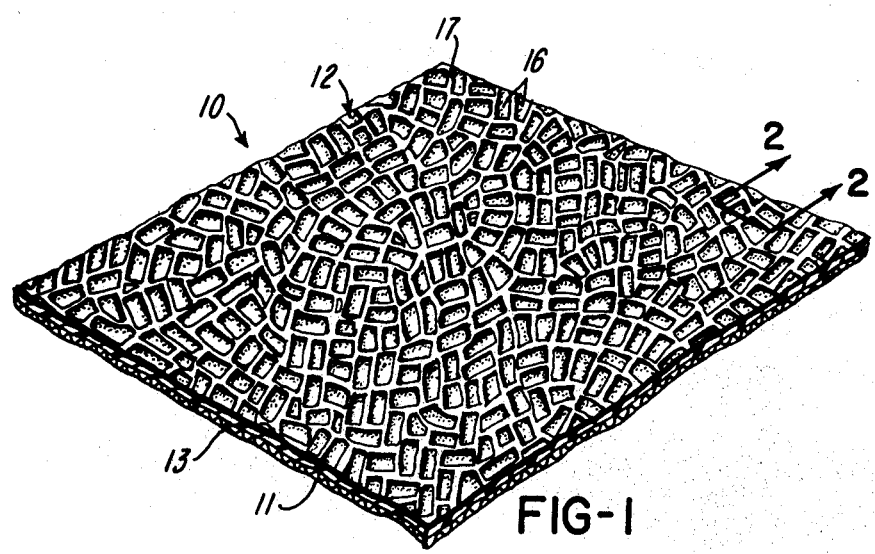
FIG. 1 is a perspective view with parts in elevation, parts in cross-section, and parts broken away illustrating one exemplary embodiment of the lightweight wall covering of this invention.

Reference is now made to FIG. 1 of the drawing which illustrates one exemplary embodiment of a lightweight wall covering of this invention which is designated generally by the reference numeral 10. The wall covering 10 has a substantially smooth inside surface 11 and a textured outer layer which is designated generally by the reference numeral 12 which in the wall covering art may be considered as a deeply textured outer layer and will be described in more detail subsequently. Further, this reference to the wall covering 10 being of lightweight indicates that such wall covering has a weight of less than 14 ounces per square yard and this weight compares favorably with so-called deep textured wall coverings proposed heretofore which are generally of the order of 22 ounces per square yard, and more.

The wall covering 10 comprises a substrate 13 having an exposed surface defining an inside surface 11 of such wall covering which is substantially smooth, a fluid impervious film 14 bonded by suitable adhesive means in the form of an adhesive 15 against the substrate 13, and an embossed expanded vinyl plastisol bonded against the film 14 and defining a textured outer layer 12 of wall covering 10. The textured outer layer is defined by alternating recesses 16 and dense projections 17 with only a representative few of the recesses 16 and projections 17 being so designated by their respective reference numerals in the drawing. The projections 17 are preferred to as dense projections inasmuch as such projections are substantially free of voids or air spaces, i.e., each projection 17 is basically of solid cross-section throughout with the voids constituting less than 10 percent of the volume of layer 12. Further, the textured outer layer 12 has a substantially fluid impervious skin and the skin 20 is defined during the embossing action by the associated embossing apparatus and as will be described in more detail in connection with the method of this invention.

The wall covering 10 may also have a protective coat or coating 21 which may be of the order of 1 to 2 mils thick. The protective coat 21 is suitably bonded against the skin 20 and provides a protective finish or outermost wear surface for the skin 20 and hence wear layer 12. The coat 21 may be defined employing an aqueous or non-aqueous solution and such coat may be clear or pigmented depending upon the desired textured appearance. The manner in which the coat 21 may be applied will be discussed subsequently in connection with the method of this invention.

The substrate 13 may be any suitable substrate material consistant with maintaining weight of the overall completed wall covering at a minimum. For example, such material may be in the form of a woven or non-woven scrim fabric which may be made of any suitable natural fiber or synthetic fiber. In one application of this invention the base fabric was made of a scrim fabric known in the art as tobacco cloth. However, regardless of the specific material used the overall thickness of the substrate 13 is preferably kept at a minimum and may be generally of the order of 4 to 6 mils.

The fluid impervious film 14 which is bonded against the substrate layer 13 may be made of any suitable material known in the art. Preferably such film is in the form of a synthetic plastic such as polyvinyl chloride and such film may be of the order of 2 to 3 mils in thickness. The film 14 is bonded to the substrate 13 by adhesive 15 as previously mentioned and such adhesive is preferably in the form of a polyvinyl chloride plastisol which is applied as a liquid coat and the liquid therein is driven out during the process of making the wall covering 10 of this invention as will be described in detail subsequently.

The film 14, in essence, serves as a sealant for the loosely constructed scrim substrate 13, which prevents strike through of liquid vinyl plastisol used to make layer 12 whereby the material used to make layer 12 need not be so dense and heavy. The film 14 also cooperates with the scrim substrate 13 to increase the strength of the two ply laminate defined by film 14 and the substrate 13.

The embossed and expanded vinyl plastisol outer layer 12 is a chemically blown vinyl plastisol in its completed or final form and such layer has been chemically blown prior to embossing thereof. The outer layer 12 may be a single color throughout which may be a single solid color; however, it will be appreciated that the outer layer may be a decorative multi-color pattern throughout. The embossed expanded vinyl plastisol is preferably in the form of a polyvinyl chloride (PVC) plastisol and a specific example of such plastisol and an exemplary chemical agent which provides chemical blowing or expansion of the plastisol compound will be presented subsequently.

The overall thickness of the outer layer 12 and in particular from the outermost surface of the projections 17 (as coated with protective coat 21) to the interface of the film 14 with the outer layer 12 is indicated at 22 and may be as much as roughly 70 mils, i.e., 0.070 inch. Generally such thickness may range between 30 and 70 mils depending on the wall covering pattern or design.

Figure 2:
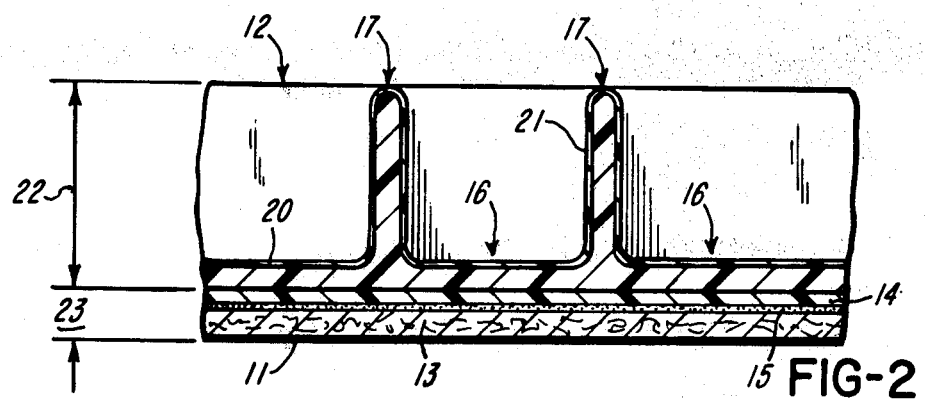
FIG. 2 is a greatly enlarged fragmentary cross-sectional view taken essentially on the line 2—2 of FIG. 1.

The scrim fabric or substrate 13 may range in thickness from 4 to 6 mils and the film 14 may range from 2 to 3 mils whereby the combined thickness of substrate 13 and film 14 may be a particular amount ranging beteen 6 and 9 mils exclusive of the adhesive 15, which may be 1 mil thick, resulting in the bonded layers 13 and 14 having a combined thickness 23 as seen in FIG. 2. With the thickness of the outer layer 12 ranging between 30 and 70 mils such outer layer thickness may be within the range of 3 to 12 times the particular thickness 23 yet with the weight per square yard of covering 10 being less than 14 ounces. With dimensions as indicated herein it will be appreciated that the wall covering 10 has a deep texture for optimum aesthetic appeal.

Figure 3:
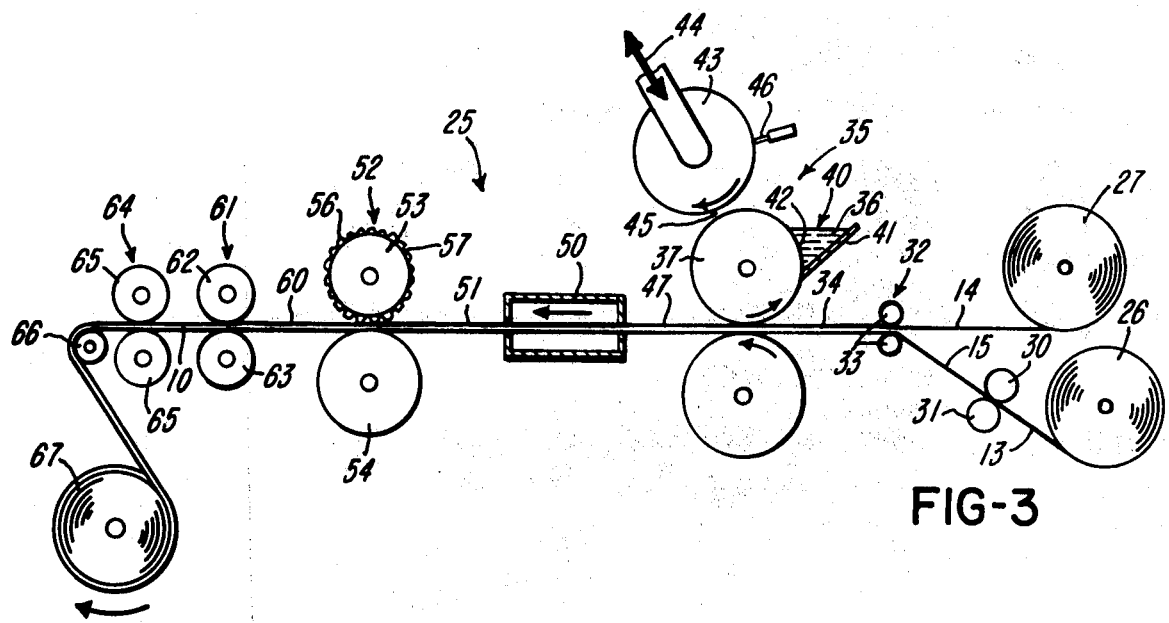
FIG. 3 is a primarily schematic view in elevation with parts in cross-section and parts broken away illustrating one exemplary embodiment of the method of this invention and apparatus associated therewith which may be employed in making the exemplary wall covering of FIG. 1.

Having described the wall covering 10 per se and its component parts, reference is now made to FIG. 3 of the drawing which illustrates an exemplary method of this invention which is designated generally by the reference numeral 25 and apparatus associated therewith for making the wall covering 10 of this invention. In describing the method 25 certain stock components which are employed to define the wall covering 10 will be designated by the same reference numbers as in the completed wall covering and this has been done for ease of presentation and understanding of the invention.

The method 25 comprises providing a substrate in the form of a web of scrim material 13 which has a surface which is adapted to define the smooth inside surface 11 of the final wall covering 10. The scrim material may be any suitable material employed in the art and is provided on a supply roll 26 thereof and supported for unwinding rotation. The method 25 also comprises providing suitable film preferably in the form of a web 14 of a suitable synthetic plastic material, preferably polyvinyl chloride, and such web is provided on a supply roll 27 thereof and supported for unwinding rotation.

The substrate 13 has adhesive means or adhesive 15 suitably applied on the top surface thereof and the adhesive may be applied employing an adhesive applicator such as a roll or cylinder 30 of any suitable known construction in cooperation with a backup roll 31 disposed therebeneath. The adhesive 15 may be of any suitable type, such as water based adhesive, which is compatible with the materials comprising webs 13 and 14. Further, with a water based adhesive the water therein evaporates during the carrying out of the method steps of method 25 providing a tenacious bond between substrate 13 and the film 14.

The fluid impervious PVC film 14 is bonded against the substrate 13 using the adhesive 15 at a bonding or laminating station 32 by compressing the substrate 13 and the PVC film 14 together with the adhesive 15 interposed therebetween and this is achieved utilizing a pair of suitable cooperating compressing or combining rolls each designated by the same reference numeral 33; and, the laminated construction thereby defined is designated by the reference numeral 34.

After laminating substrate 13 and film 14 at the bonding station 32 a controlled thickness of a suitable liquid vinyl plastisol is disposed against the film 14 at a plastisol disposing or applying station designated by the reference numeral 35. The liquid vinyl plastisol applied on construction 34 at station 35 is in viscous liquid form and is designated generally by the reference numeral 36.

The liquid vinyl plastisol 36 of this example has a suitable chemical blowing agent compounded therein which in this example is an azo-dicarbonamide. Other blowing agents may also be used, such as benzenesulfonyl hydrazide. The amount of such chemical blowing agent in an exemplary formulation of plastisol 36 and its other constituents will be presented subsequently. The liquid vinyl plastisol 36 is applied by what is commonly referred to as a reverse roll method. In particular, it will be seen that the coating action is produced by coating a roller 37 with liquid vinyl plastisol 36 by rotating such roller 37 through a reservoir 40 which contains the liquid containing walls 41 which cooperate with the circumferential surface 42 of the roller 37.

The application or disposing of the liquid vinyl plastisol 36 on construction 34 is preferably achieved in a single pass without strike. The roller 37 accomplishes its coating action while moving in a direction opposite from the direction of movement of the construction or laminate 34.

The amount of liquid vinyl plastisol 36 on the surface of the roller 37 before it contacts construction 34 and hence the thickness of plastisol 36 is precisely controlled using any suitable technique; and, in this example of the invention a metering roller 43 is employed for this purpose which is adjustable by a suitable adjusting mechanism indicated schematically by double arrow 44 to provide a controlled gap 45 between the adjustable roller 43 and the applicator roller 37. A suitable doctor blade 46 may be provided in operative association with the roller 43 to prevent excessive accumulation of vinyl plastisol on the roller 43.

The disposing of the controlled thickness of liquid vinyl plastisol 36 on the laminate defines a coated laminated construction or coated laminate 47 comprised of the liquid vinyl plastisol 36 and its supporting substrate 13 and film 14 and such coated laminate 47 is subjected to a controlled elevated temperature in a suitable heating device such as an oven 50. The temperature in the oven may be controlled using any suitable means or technique known in the art and such temperature serves to activate the chemical blowing agent in the liquid vinyl plastisol 36 and thus define a laminated construction 51 having the expanded vinyl plastisol disposed thereon.

The laminated construction 51 is then passed through an embossing station 52 comprised of an embossing roller 53 and a backup roller 54. The backup roller 54 has a substantially yieldable resilient outer surface made of a suitable elastomeric material; and, the backup roller 54 cooperates with the embossing roller 53 to define the textured outer layer 12 of the wall covering 10. The embossing roller 53 provides the outer layer 12 which is deep textured and simultaneously provides a substantially fluid impervious skin for layer 12. The embossing roller 53 has alternating projections 56 and recesses 57 which define the alternating recesses 16 and projections 17 respectively of the outer layer 12 and thus define the desired texture therein. It will be appreciated that the embossing roller 53 may be varied in the construction and arrangement of its projections 56 and recesses 57 to provide any desired pattern in the outer layer.

The embossed laminated construction exiting the embossing station 52 is designated by the reference numeral 60 and may have a protective film finish coat 21 suitably applied thereon at an outer coat applying station 61, and such coat 21 may be of the order of one mil and less. The finish coat may be applied at station 61 employing a suitable applying cylinder 62, such as a gravure cylinder or fabric sleeve coated cylinder to complete the wall covering structure. The cylinder 62 cooperates with a suitable backup cylinder 63.

The still hot and coated wall covering 10 is then suitably cooled at a cooling station 64. The cooling action at the cooling station 64 may be achieved employing any suitable technique known in the art; and, in this example of the invention a pair of cooperating cooling rollers, each designated by the same reference numeral 65 is employed. The cooling rollers 65 may be cooled using any suitable technique such as circulating cold tap water, or the like, therethrough. It will also be appreciated that other techniques may be employed for cooling the hot wall covering 10. After cooling, the wall covering 10 is moved around a suitaable turn roll 66 and wound in coil form to define a supply roll 67 thereof.

The method of this invention results in the provision of a deep textured lightweight wall covering 10 having a weight of less than 14 ounces per square yard yet the overall or total thickness of such material may range between roughly 36 and 80 mils. Further, the outer layer 12 alone may be within the range of 30 to 70 mils.

Although any suitable vinyl plastisol may be employed, a typical lightweight wall covering of this invention having a single color may be comprised of the component parts by weight as shown in the following Table A.

TABLE - A

| | |
|---|---|
| 60 Parts | dispersion grade PVC resin |
| 40 Parts | extender grade PVC resin |
| 26 Parts | dioctylphthalate |
| 28 Parts | filler paste |
| 24 Parts | color pigment paste |
| 2 Parts | barium-cadmium-zinc stabilizer |
| 5 Parts | naphtha diluent |
| 2 Parts | azo-dicarbonamide blowing agent |
| 187 Total Parts | |

In the example of Table A the blowing agent is shown consisting of two parts by weight of the liquid vinyl plastisol formulation; however, such blowing agent may comprise between 1 and 3 parts of such formulation.

As previously indicated, the laminated construction 47 is passed through the oven 50 which is heated to a controlled temperature. In the case of a formulation such as shown in Table A wherein the vinyl plastisol was comprised primarily of polyvinyl chloride (PVC) resins the temperature of the oven is preferably controlled within the range of 360° to 380° F. to activate the chemical blowing agent.

In the example presented in connection with the method 25 disclosed in FIG. 3 a colored pigment paste is employed to provide a substantially solid color for the textured outer layer 12. However, it will be appreciated that in some applications of this invention it may be preferred to provide a decorative pattern comprised of a plurality of colors for the outer layer 12. In applications of this type, decorative print pattern may be applied against the construction 47 employing any suitable technique known in the art and at temperatures under 310° F. to prevent activation of the blowing agent; and, the construction thus defined is then passed between a pair of cooperating laminating rollers. The resulting laminate is then moved through the oven 50 and subjected to the previously mentioned temperatures of 360° to 380° F. to activate the blowing agent. The resulting laminate exiting the oven 50 is then processed in the manner previously described.

In the presentation of FIG. 3 of the drawing it will be seen that supports for the various components, drive systems, power sources, control devices, and the like have not been illustrated; however, it is to be understood that these items will be provided as required and as is known in the art.

While present exemplary embodiments of this invention and methods of practicing the same, have been illustrated and described, it will be recognized that this invention may be otherwise variously embodied and practiced within the scope of the following claims.

What is claimed is:

1. A lightweight wall covering having a weight of less than 14 ounces per square yard and having a substantially smooth inside surface and a deep textured outer layer comprising, a substrate having an exposed surface defining said inside surface, a fluid impervious film bonded against said substrate, and an embossed expanded vinyl plastisol bonded against said film and defining said textured outer layer, said textured outer layer being defined by alternating recesses and dense projections substantially free of air spaces said air spaces constituting less than 10 percent of the volume of said outer layer, said textured outer layer having a substantially fluid impervious skin, said substrate and film having a combined thickness of a particular amount of roughly 10 mils and less, and the outermost surfaces of said projections having a maximum thickness measured from the interface of said textured outer layer with said film which is within the range of roughly 3 to 12 times said particular amount and defines said deep texture in said outer layer.

2. A wall covering as set forth in claim 1 in which said expanded vinyl plastisol is a chemically blown vinyl plastisol.

3. A wall covering as set forth in claim 2 in which said expanded vinyl plastisol is of a single color throughout.

4. A wall covering as set forth in clam 2 in which said expanded vinyl plastisol is of a decorative multicolor pattern throughout.

5. A wall covering as set forth in claim 2 in which said substrate is a scrim fabric.

6. A wall covering as set forth in claim 5 in which said film is a polyvinyl chloride film.

7. A wall covering as set forth in claim 6 and further comprising a protective coat bonded against said fluid impervious skin.

* * * * *